United States Patent [19]

Asawa et al.

[11] 4,320,205

[45] Mar. 16, 1982

[54] PROCESS FOR PRODUCING FLUORINATED POLYMER HAVING ION-EXCHANGE GROUPS

[75] Inventors: Tatsuro Asawa; Haruhisa Miyake, both of Yokohama; Masami Yamashita, Yokosuka, all of Japan

[73] Assignee: Asahi Glass Company, Ltd., Tokyo, Japan

[21] Appl. No.: 183,165

[22] Filed: Sep. 2, 1980

[30] Foreign Application Priority Data

Sep. 25, 1979 [JP] Japan ................................ 54-122100

[51] Int. Cl.$^3$ .............................................. C08F 2/06
[52] U.S. Cl. ...................................... 521/38; 526/245
[58] Field of Search ........................... 521/38; 526/245

[56] References Cited

U.S. PATENT DOCUMENTS 3,637,614 1/1972 Greenwood ........................ 526/245
3,767,728 10/1973 Longsorn et al. .................. 526/245
4,000,356 12/1976 Weisgerber et al. ............... 526/206
4,116,888 · 9/1978 Upihashi et al. ..................... 521/38

*Primary Examiner*—William F. Hamrock
*Assistant Examiner*—Peter F. Kulkosky
*Attorney, Agent, or Firm*—Oblon, Fisher, Spivak, McClelland & Maier

[57] ABSTRACT

A fluorinated copolymer having ion-exchange group is produced by copolymerizing a fluorinated ethylenic unsaturated monomer and a functional monomer having a functional group of carboxylic acid group or a group which can be converted to carboxylic acid group in an aqueous medium in the presence of a polymerization initiator source and in the presence of a specific molecular weight regulator. The specific molecular weight regulator is selected from the group consisting of aliphatic alkanes alicyclic alkanes and water soluble organic solvents and controls the molecular weight without lowering the copolymerization velocity and without lowering the stability of the aqueous latex.

12 Claims, No Drawings

PROCESS FOR PRODUCING FLUORINATED POLYMER HAVING ION-EXCHANGE GROUPS

BACKGROUND OF THE INVENTION

1. Field of the Invention

The present invention relates to a process for producing a fluorinated polymer having ion-exchange groups. More particularly, it relates to an improved process for producing a fluorinated polymer having carboxylic acid type cation exchange groups by a copolymerization in an aqueous medium.

2. Description of the Prior Arts

It has been known that a cation exchange membrane of a carboxylic acid type fluorinated polymer is used as a membrane for partitioning in a membrane type electrolysis of an aqueous solution of an alkali metal chloride to produce an alkali metal hydroxide having high purity and to attain an operation at high current efficiency and high current density and also to produce an alkali metal hydroxide at high concentration in a cathode compartment, for example, excellent characteristics for providing a current efficiency of greater than 90% even though a concentration of the resulting sodium hydroxide is higher than 40%.

It has been proposed to produce a fluorinated polymer having carboxylic acid type cation exchange groups which has high ion exchange capacity and remarkably high molecular weight by a copolymerization in an aqueous medium at a ratio of the aqueous medium to the carboxylic acid type monomer of less than 20:1 under a pressure of higher than 7 kg./cm$^2$. This is disclosed in U.S. Pat. No. 4,138,373 and U.K. Pat. No. 1,552,060 and Japanese Unexamined Patent Publication No. 49090/1978.

The inventors have studied various copolymerizations of a carboxylic acid type monomer and a fluorinated olefin such as tetrafluoroethylene in an aqueous medium and have found the following interest facts.

It has been found that the molecular weights of the copolymers can be controlled in a wide range by polymerizations in an aqueous medium with a water soluble organic solvent such as alcohols or an aliphatic or alicyclic alkane such as ethane and cyclohexane. In accordance with the control of the molecular weight by said incorporation, the reduction of the polymerization velocity is only small and a reproducibility for molecular weight is remarkably high and the stability of the resulting latex is not lost.

When an alkane is incorporated as a molecular weight regulator, the following effect is found. The deterioration of the monomers in the copolymerization in an aqueous medium can be reduced and the copolymerization velocity can be increased. Since the deterioration of the monomers in the copolymerization is reduced, the efficiency in utilization of the carboxylic acid type monomer is improved to increase the yield of the object copolymer and undesirable effects on the characteristics of the object copolymer is prevented.

SUMMARY OF THE INVENTION

It is an object of the present invention to provide a process for producing a fluorinated polymer having ion-exchange groups which has excellent characteristics at high polymerization velocity in high yield.

The foregoing and other objects of the present invention have been attained by producing a fluorinated polymer having ion exchange groups and containing the carboxylic acid type monomer units of 5 to 30 mol % by copolymerizing a fluorinated ethylenically unsaturated monomer and a functional monomer having a functional group of carboxylic acid group or a group which can be converted to carboxylic acid group in an aqueous medium in the presence of a polymerization initiator source and a molecular weight regulator selected from the group consisting of aliphatic alkanes, alicyclic alkanes and water soluble organic solvents at a ratio of 0.0001 to 10 wt. parts per 100 wt. parts of the aqueous medium.

DETAILED DESCRIPTION OF THE PREFERRED EMBODIMENTS

In the process of the present invention, a functional monomer having carboxylic acid group or a functional group which can be converted to carboxylic acid group is used as the functional monomer.

The carboxylic acid type functional monomer (I) is preferably a fluorovinyl compound from the viewpoints of the chlorine resistance and oxidation resistance of the resulting copolymer.

Suitable functional monomers are fluorovinyl compounds having the formula

wherein p is 0 or 1; l is 0 to 3; m is 0 to 1; n is 0 to 12; X represents —F, —Cl or —CF$_3$ X' represents —F or —CF$_3$; Y and Y' respectively represent —F or a C$_{1-10}$ perfluoroalkyl group; A represents —CN, —COF, —COOH, —COOR$_1$, —COOM or —COONR$_2$R$_3$; R represents a C$_{1-10}$ alkyl group; R$_2$ and R$_3$ respectively represent —H or R$_1$; M represents an alkali metal atom or a quaternary ammonium group.

From the viewpoints of the property and availability, it is preferable to use the fluorovinyl compound having the above-mentioned formula wherein X and X' are —F; Y is —CF$_3$; Y' is —F; p is 0 or 1; l is 0 to 1; m is 0 to 1; n is 0 to 8.

From the viewpoint of the copolymerization reaction, it is preferable to use the fluorovinyl compound having the formula wherein A is —COOR$_1$ and R$_1$ is a C$_{1-5}$ alkyl group.

Typical fluorovinyl compounds include

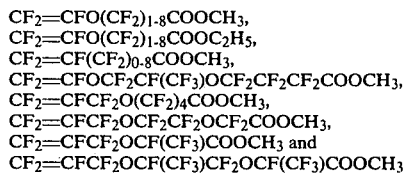

Suitable fluorinated ethylenic unsaturated monomers (II) include C$_2$F$_4$, C$_2$F$_3$Cl, C$_3$F$_6$, C$_2$HF$_3$, C$_2$H$_2$F$_2$ and C$_2$H$_3$F.

The fluorinated ethylenic unsaturated monomers are preferably fluorinated olefins having the formula

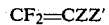

wherein Z and Z' respectively represent —F, —Cl, —H or —CF$_3$. It is preferable to use a perfluoroolefine especially tetrafluoroethylene.

In the process of the invention, it is possible to use two or more types of the functional monomers (I) and the ethylenic unsaturated monomers (II), respectively.

It is also possible to add one or more other monomer such as an olefin compound (III) having the formula

$CH_2=CR_4R_5$ wherein $R_4$ and $R_5$ respectively represent —H, a $C_{1-8}$ alkyl group or an aromatic ring; a fluorovinyl ether having the formula

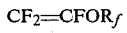
$CF_2=CFOR_f$ wherein $R_f$ represents a $C_{1-10}$ perfluoroalkyl group; a divinyl monomer e.g. $CF_2=CF-CF=CF_2$ and $CF_2=CFO(CF_2)_{1-4}OCF=CF_2$ and the other functional monomers e.g. a sulfonic acid type functional monomer.

Suitable olefins (III) include ethylene, propylene, butene-1, isobutylene, styrene, α-methyl styrene, pentene-1, hexene-1, heptene-1, 3-methyl butene-1, 4-methyl pentene-1, etc.

From the viewpoints of the manufacture and property of the resulting copolymer, it is especially preferable to use ethylene, propylene, isobutylene, etc.

When a divinyl monomer or the like is added, the resulting copolymer is crosslinkable and the mechanical strength of the membrane made of the crosslinked copolymer is improved.

The ratio of the functional monomer (I), the fluorinated olefin (II), and the olefin compound (III) and the other component are important because it relates to characteristics of a cation exchange membrane for an electrolytic cell.

The content of the functional monomer (I) is important and directly relates to an ion exchange capacity and is preferably 5 to 30 mole %.

When the content of the functional monomer (I) is too high, the resulting cation exchange membrane has disadvantageously low mechanical strength and low ion permselectivity caused by the increase of the water content.

When the content of the functional monomer (I) is too low, the ion exchangeable function is disadvantageously lost.

The fluorinated olefin (II), the olefin compound (III) and the other compound are the residual components in the copolymer. The content of the olefin (III) is important and relates to the electrical and mechanical properties and the chlorine resistance of the resulting cation exchange membrane.

Accordingly, when the olefin compound (III) is added, the molar ratio of the olefin compound (III) of the fluorinated olefin (II) is preferably 5/95 to 70/30, especially 10/90 to 60/40.

When the fluorovinyl ether or the divinyl ether is added, it is preferable to give a content of the fluorovinyl ether or the divinyl ether of less than 30 mole % preferably 2 to 20 mole % in the copolymer.

The ion exchange capacity of the copolymer can be in a range of 0.5 to 2.2 meq./g dry polymer. It is special characteristic that even though the ion exchange capacity is large, the molecular weight of the resulting copolymer can be high whereby the mechanical strength and durability of the copolymer can be high enough.

The ion exchange capacity is dependent upon the type of the copolymer in the above-mentioned range and is preferably more than 0.8 meq./g dry polymer, especially more than 1.0 meq./g dry polymer, from the viewpoints of the mechanical and electrochemical properties as the cation exchange membrane.

The molecular weight of the copolymer produced by the process of the invention is important and relates to the mechanical properties and the fabricability of the cation exchange membrane.

When it is shown by the value of $T_Q$, it is usual to have $T_Q$ of higher than 150° C. preferably 170° to 340° C. especially about 180° to 300° C.

The term of $T_Q$ is defined as follows.

The term of $T_Q$ relates to a molecular weight of the copolymer and is a temperature to result in a volumetric melt flow rate of 100 mm$^3$/second. The volumetric melt flow rate is a rate of the molten copolymer flowed out from an orifice having a diameter of 1 mm and a length of 2 mm at a specific temperature under the load of 30 kg/cm$^2$ and is shown by a unit of mm$^3$/second.

In the examples, an ion exchange capacity of a cation exchange membrane was measured as follows.

A H-type cation exchange membrane was immersed into 1N-HCl at 60° C. for 5 hours to completely convert it to H-type membrane, and then the membrane was washed with water so as to be free of HCl. Then, 0.5 g. of the H-type membrane was immersed into a solution prepared by adding 25 ml of water to 25 ml of 0.1 N—NaOH. Then, the membrane was taken out and the amount of NaOH in the solution was measured by a back titration with 0.1 N—HCl.

In the process of the present invention, it is important to carry out the copolymerization of the functional monomer and the fluorinated olefin in an aqueous medium. It is preferable to carry out the copolymerization by using an aqueous medium at a ratio of the aqueous medium to the functional monomer of less than 20/1 by weight preferably less than 10/1 by weight. When the amount of the aqueous medium is too much, the reaction velocity of the copolymerization is remarkably low. It takes a long time for obtaining high yield of the copolymer. Moreover, when the amount of the aqueous medium is too much, it is difficult to give high molecular weight in the case of high ion exchange capacity. The use of a large amount of the aqueous medium causes the following disadvantages. For example, a large size of a reactor is needed. The operation for separation and a recovery of the copolymer are disadvantageous.

In the process of the invention, it is important to carry out the copolymerization under the pressure of higher than 7 kg/cm$^2$. When the pressure for the copolymerization is too low, it is difficult to maintain the reaction velocity for the copolymerization is enough high level and to produce the copolymer having high molecular weight. When the pressure for copolymerization is too low, the ion exchange capacity of the resulting copolymer is too high whereby the mechanical strength and the ion permselectivity are lowered by the increase of the water content.

The pressure for copolymerization is preferably selected from the range of less than 50 kg./cm$^2$, from the viewpoints of the reactor and the operations in the industrial process. Even though higher pressure for copolymerization can be employed, the effect of the invention is not proportionally improved by increasing the pressure. Accordingly, the pressure for copolymerization is usually in a range of 7 to 50 kg./cm$^2$ preferably 9 to 30 kg./cm$^2$.

In the process of the present invention, it is important to carry out a copolymerization in the presence of the specific molecular weight regulator selected from the group consisting of aliphatic or alicyclic alkanes and water soluble organic solvents.

The alkanes can be various alkanes preferably a $C_1$–$C_8$ alkanes such as methane, ethane, propane, butane, pentane, hexane, heptane and octane; a cycloalkane such as cyclobutane, cyclopentane and cyclohexane. It is also possible to use a branched alkane such as isobutane, isopentane, isohexane and 3-methyl-pentane and an alkyl substituted cycloalkane such as methylcyclopentane and methylcyclohexane.

The water soluble organic solvents can be various solvents and preferably a $C_1$–$C_8$ alcohol such as methanol, ethanol, isopropanol, butanol, ethyleneglycol and propyleneglycol. It is also possible to use an alkyleneoxide such as ethyleneoxide, propyleneoxide; an aldehyde such as formaldehyde and acetoaldehyde; a ketone such as acetone, and methyl ethyl ketone, a cyclic ether such as dioxane and tetrahydrofuran and a lactone such as $\gamma$-butyrolactone.

The specific molecular weight regulator can be incorporated before the copolymerization or during the copolymerization continuously or in separate additions. The specific molecular weight regulator is incorporated at a ratio of 0.0001 to 10 wt. parts preferably 0.001 to 5 wt. parts per 100 wt. parts of the aqueous medium.

When it is too small, it is difficult to control the molecular weight. When it is too much, the molecular weight is remarkably lowered whereby it is difficult to obtain a desired cation exchange membrane and the polymerization velocity is lowered.

In the copolymerization of the invention, the reaction condition, the other condition and the operation are not specifically limited and can be selected from wide ranges. For example, the optimum reaction temperature for copolymerization can be selected depending upon the type of the polymerization initiator source, the aqueous medium or the molar ratio of the components in the reaction, etc. In usual, high or low temperature is not advantageous in the industrial process and accordingly, it is selected from the range of 20° to 90° C. preferably about 30° to 80° C.

Thus, it is preferable to select the polymerization initiator source which imparts high activity at the reaction temperature in the process of the invention.

It is possible to use ionized high energy radiation at room temperature, however, it is preferable to use an azo compound or a peroxy compound in the industrial process.

Suitable polymerization initiator sources are compounds having high activity at about 20° to 90° C. under the reaction pressure for copolymerization and include diacyl peroxides such as disuccinic peroxide, benzoyl peroxide, lauroyl peroxide and dipentafluoropropionyl peroxide; azo compounds such as 2,2'-azobis(2-aminopropane) hydrochloride, 4,4'-azobis(4-cyanovalerianic acid) and azobisisobutyronitrile; peroxyesters such as t-butyl peroxyisobutylate and t-butyl peroxypivalate; peroxydicarbonates such as diisopropyl peroxydicarbonate and di-2-ethylhexyl peroxydicarbonate; hydroperoxides such as diisopropylbenzene hydroperoxide; inorganic peroxides such as potassium persulfate and ammonium persulfate; and redox systems thereof.

In the process of the invention, the concentration of the polymerization initiator is usually in a range of 0.0001 to 3 wt.% preferably 0.001 to 2 wt.% to total monomers.

The molecular weight of the resulting copolymer can be increased and high ion exchange capacity is kept by decreasing the concentration of the polymerization initiator. When the concentration of the polymerization initiator is too high, the molecular weight of the copolymer is decreased to cause disadvantages for the production of the copolymer having high ion exchange capacity and high molecular weight.

It is possible to incorporate a desired conventional surfactant, a dispersing agent, a buffer agent and a pH regulator used in the conventional polymerizations in an aqueous medium. It is also possible to incorporate an inert organic solvent such as a fluorinated or chloroflourinated saturated hydrocarbon known as fluorocarbon solvents, which do not inhibit the copolymerization of the fluorinated olefin with the specific functional monomer and have not high chain transfer activity.

In the process of the invention, it is preferable to carry out the copolymerization under controlling the concentration of the resulting copolymer to less than 40 wt.% preferably less than 30 wt.%. When the concentration is too high, the disadvantages of high load for stirring, difficulty of heat removal and insufficient absorption and diffusion of the fluorinated olefin gas are found.

The copolymer of the invention can be processed to form a membrane by desired methods. For example, the functional group is converted to carboxylic acid group by the hydrolysis, if necessary. The hydrolysis can be carried out before or after the fabrication of a membrane. It is usually preferable to hydrolyze it after the fabrication of a membrane.

The fabrication of a membrane can be carried out by various methods such as heat melt molding method, a latex molding method, a casting method using a solvent solution of the copolymer and other known methods.

The cation exchange membranes made of the copolymers of the invention have excellent characteristics and can be used in various field, various objects and various usages. For example, they can be preferably used in the field in which the anticorrosion is required, as a diaphragm for a diffusion dialysis, an electrolytic reduction and a fuel cell.

When it is used as a cation selective membrans for an electrolysis of alkali metal compound, high performance which could not be attained by using the conventional cation exchange membrane can be achieved.

Thus, in the case of the two compartment cell wherein an anode compartment and a cathode compartment are formed by partitioning the anode and the cathode with the cation exchange membrane made of the fluorinated copolymer of the invention, and an aqueous solution of an alkali metal chloride is fed into the anode compartment to electrolyze it to obtain an alkali hydroxide from the cathode compartment, it is possible to produce sodium hydroxide having high concentration of higher than 40% in high current efficiency of higher than 90% by electrolyzing an aqueous solution of sodium chloride having a concentration of higher than 2 N under the current density of 5 to 50 A/dm$^2$.

It is also possible to attain the electrolysis in low cell voltage of lower than 4.5 volts.

A further understanding can be obtained by reference to certain specific examples which are provided herein for purposes of illustration only and are not intended to be limiting unless otherwise specified.

EXAMPLE 1

In a 0.2 liter stainless steel autoclave, 100 g. of water, 0.2 g. of $C_8F_{17}COONH_4$, 0.5 g. of $NaH_2PO_4.2H_2O$, and 0.052 g. of $(NH_4)_2S_2O_8$ were charged and then, 20 g. of $CF_2=CFO(CF_2)_3COOCH_3$ and 0.02 g. of ethane were charged. Air in the autoclave was purged with liquid nitrogen and the autoclave was heated to 60° C. and tetrafluoroethylene was fed at a rate of 15.2 kg./cm² to initiate the reaction. During the reaction, tetrafluoroethylene was continuously fed to maintain the pressure of 15.2 kg./cm². After 4 hours, 18.2 wt.% of a latex was obtained. The unreacted tetrafluoroethylene gas was purged and the unreacted $CF_2=CFO(CF_2)_3COOCH_3$ was separated by extracting with trichlorotrifluoroethane and then, $H_2SO_4$ was added to precipitate and to separate the copolymer from the latex. The separated polymer was washed with water and with methanol and then, methanol at a ratio of 5 times of the weight of the copolymer was added and the mixture was stirred at 60° C. for 16 hours. The polymer was separated from methanol and dried at 60° C. under a reduced pressure to obtain 22.2 g. of white copolymer having $T_Q$ of 215° C. Excellent film having a thickness of 300μ was obtained by heat-press-molding at 215° C. The film was hydrolyzed to obtain a cation exchange membrane having an ion-exchange capacity of 1.25 meq./g.

A percent decomposition of monomer of $CF_2=CFO(CF_2)_3$. $COOCH_3$ is defined by the equation:

$$100 \times (A-B-C)/A$$

wherein A: the charged functional monomer; B: functional monomer units in the polymer; and C: the unreacted functional monomer.

The percent decomposition of $CF_2=CFO(CF_2)_3COOCH_3$ monomer was 9.1%.

EXAMPLE 2

In accordance with the process of Example 1 except charging 0.02 g. of n-hexane instead of ethane and copolymerizing under a pressure of 14.5 kg./cm² a copolymerization was carried out. After 6.4 hours, 16.8 wt.% of a latex was obtained and 20.2 g. of the copolymer having $T_Q$ of 221° C. and an ion-exchange capacity of 1.27 meq./g. was obtained. The percent decomposition of $CF_2=CFO.(CF_2)_3COOCH_3$ monomer was 8.0%.

EXAMPLE 3

In accordance with the process of Example 2 except charging 0.015 g. of cyclohexane instead of n-hexane, a copolymerization was carried out. A copolymer having $T_Q$ of 222° C. and an ion-exchange capacity of 1.26 meq./g. was obtained.

EXAMPLE 4

In accordance with the process of Example 2 except charging 0.017 g. of isopropyl alcohol instead of n-hexane, a copolymerization was carried out. After 7.5 hours, 17.0 wt.% of a latex was obtained and 20.5 g. of a copolymer having $T_Q$ of 215° C. and an ion exchange capacity of 1.28 meq./g. was obtained. The percent decomposition of $CF_2=CFO(CF_2)_3COOCH_3$ monomer was 19.5%.

EXAMPLE 5

In a 0.2 liter stainless steel autoclave, 100 g. of water, 0.2 g. of $C_8F_{17}COONH_4$, 0.5 g. of $NaH_2PO_4.2H_2O$, 0.026 g. of $(NH_4)_2S_2O_8$ were charged, and then, 20 g. of $CF_2=CFO(CF_2)_3COOCH_3$ and 0.008 g. of isopropyl alcohol were charged. Air in the autoclave was purged with liquid nitrogen, and the autoclave was heated at 60° C. and tetrafluoroethylene was fed at a rate of 14.5 kg./cm² to initiate the reaction. During the reaction, tetrafluoroethylene was continuously fed to maintain a pressure of 14.5 kg./cm². After 6 hours, 17.3 wt.% of a latex was obtained. The unreacted tetrafluoroethylene was purged. The unreacted monomer of $CF_2=CFO(CF_2)_3COOCH_3$ was extracted with trichlorotrifluoroethane and then $H_2SO_4$ was added to precipitate and to separate the copolymer. The separated polymer was washed with water and with acetone and then with trichlorotrifluoroethane. Methanol was added at a ratio of 5 times of the copolymer and the mixture was treated at 60° C. with stirring for 16 hours. The copolymer was separated from methanol and dried at 60° C. under a reduced pressure to obtain 20.9 g. of a white copolymer having $T_Q$ of 230° C. Excellent film having a thickness of 300μ was obtained by heat-press-molding at 230° C. The film was hydrolyzed to obtain a cation exchange membrane having an ion-exchange capacity of 1.25 emq./g.

REFERENCE 1

In accordance with the process of Example 5 except that isopropyl alcohol was not incorporated, a copolymerization was carried out to obtain a copolymer having $T_Q$ of 295° C. It was difficult to obtain a desired film by a heat-press-molding process.

EXAMPLE 6

In accordance with the process of Example 5 except that charging 0.012 g. of isopropyl alcohol, a copolymerization and a post-treatment were carried out, to obtain a copolymer having $T_Q$ of 221° C. Excellent film having a thickness of 270μ was obtained by a heat-press-molding at 230° C. The film was hydrolyzed to obtain a cation exchange membrane having an ion-exchange capacity of 1.25 meq./g.

EXAMPLE 7

In accordance with the process of Example 5 except charging 0.5 g of acetone instead of isopropyl alcohol, a copolymerization and a post-treatment were carried out to obtain a polymer having $T_Q$ of 245° C. Excellent film having a thickness of 300μ was obtained by a heat-press-molding at 250° C. The film was hydrolyzed to obtain a cation exchange membrane having an ion-exchange capacity of 1.27 meq./g.

We claim:

1. In a process for producing a fluorinated copolymer having ion-exchange groups by copolymerizing a fluorinated ethylenically unsaturated monomer and a monomer having a carboxylic acid functional group or a group convertible to a carboxylic acid group in an aqueous medium in the presence of a polymerization initiator source, the improvement comprising: conducting the copolymerization reaction in the presence of a molecular weight regulator selected from the group consisting of aliphatic alkanes, alicyclic alkanes, a $C_1-C_8$ alcohol, an alkylene oxide, an aldehyde, a ketone, a cyclic ether and a lactone.

2. The process according to claim 1 wherein said molecular weight regulator is incorporated in the reaction mixture in an amount of 0.0001 to 10 wt. parts per 100 wt. parts of said aqueous medium.

3. The process according to claim 1 wherein said fluorinated copolymer comprises said functional monomer component in an amount of 5 to 30 mol%.

4. The process according to claim 1 wherein said alkane is a $C_1$-$C_8$ alkane.

5. The process according to claim 1 wherein said water soluble organic solvent is a $C_1$-$C_8$ alcohol.

6. The process according to claim 1, wherein the functional monomer is a fluorovinyl compound having the formula $$CF_2=CX-(CFX')_p(OCF_2CFY)_l(O)_m(CFY')_nA$$

wherein p is 0 or 1; l is 0 to 3; m is 0 to 1; n is 0 to 12; X represents —F, —Cl or —$CF_3$; X' represents —F or —$CF_3$; Y and Y' each represent —F or a $C_{1-10}$ perfluoroalkyl group; A represents —CN, —COF, —COOH, —$COOR_1$, —COOM or —$COONR_2R_3$; $R_1$ represents a $C_{1-10}$ alkyl group; $R_2$ and $R_3$ each represent —H or $R_1$; M represents an alkali metal atom or a quaternary ammonium group.

7. The process according to claim 1, wherein the fluorinated ethylenic unsaturated monomer is a fluorinated olefin having the formula $$CF_2=CZZ'$$

wherein Z and Z' each represent —F, —Cl, —H or —$CF_3$.

8. The process according to claim 5, wherein the fluorovinyl compound is the compound having the formula $$CF_2=CF(CF_2)_p(OCF_2CF)_l(O)_m(CF_2)_nA$$
$$\qquad\qquad\qquad\quad |$$
$$\qquad\qquad\qquad\; CF_3$$

wherein p is 0 or 1; l is 0 to 1; m is 0 to 1; n is 0 to 8; A represents —$COOR_1$ and $R_1$ represents a lower alkyl group.

9. The process according to claim 6, wherein the fluorinated ethylenic unsaturated monomer is tetrafluoroethylene.

10. The process according to claim 1 wherein the temperature for the copolymerization reaction is in a range of 20° to 90° C.

11. The process according to claim 1 wherein the pressure in the copolymerization reaction is in a range of 7 to 50 kg./cm$^2$.

12. The process according to claim 1 wherein the concentration of the copolymer in the slurry is controlled to less than 40 wt.% in the copolymerization reaction.

* * * * *